United States Patent [19]
Hattori et al.

[11] Patent Number: 6,031,558
[45] Date of Patent: *Feb. 29, 2000

[54] IMAGE RECORDING APPARATUS

[75] Inventors: Tsuyoshi Hattori; Ken Okauchi, both of Hino, Japan

[73] Assignee: Konica Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/558,196

[22] Filed: Nov. 15, 1995

[30] Foreign Application Priority Data

Nov. 16, 1994 [JP] Japan ................................ 6-281904

[51] Int. Cl.[7] .................................................. B41J 3/21
[52] U.S. Cl. ............................................................ 347/238
[58] Field of Search .................................. 347/238, 232, 347/119, 118, 130

[56] References Cited

U.S. PATENT DOCUMENTS

| | | | |
|---|---|---|---|
| 4,458,175 | 7/1984 | Weekley | 313/472 |
| 4,670,778 | 6/1987 | Miyakawa | 358/75 |
| 4,726,675 | 2/1988 | Shiota et al. | 347/232 X |
| 4,907,034 | 3/1990 | Doi et al. | 355/400 |
| 5,032,911 | 7/1991 | Takimoto | 358/76 |
| 5,142,388 | 8/1992 | Watanabe et al. | 359/50 |
| 5,500,572 | 3/1996 | Anagnostopoulos et al. | 315/169.1 |
| 5,592,205 | 1/1997 | Shimizu et al. | 347/232 X |

FOREIGN PATENT DOCUMENTS

| | | | |
|---|---|---|---|
| 61 269 178 | 11/1986 | Japan | G03G 15/04 |
| 62-134624 | 6/1987 | Japan . | |
| 62-134629 | 6/1987 | Japan . | |
| 63-189270 | 8/1988 | Japan . | |
| 5 278 260 | 10/1993 | Japan . | |

*Primary Examiner*—N. Le
*Assistant Examiner*—Michael Nghiem
*Attorney, Agent, or Firm*—Finnegan, Henderson, Farabow, Garrett & Dunner, L.L.P.

[57] ABSTRACT

In an apparatus for recording an image on a silver halide color photosensitive material on a basis of image data of different colors, an exposure device comprises LED recording elements and vacuum fluorescent tube elements which are controlled to conduct exposure for the different colors on the silver halide color photosensitive material on the basis of the image data.

10 Claims, 4 Drawing Sheets

IMAGE RECORDING APPARATUS

BACKGROUND OF THE INVENTION

The present invention relates to an image recording apparatus to record an image on a silver halide color photosensitive material with the use of recording elements which emit a light in accordance with image data.

Conventionally, there has been a technique to record a color image on a silver halide color photosensitive material with the use of various single light source elements or light source elements aligned in a form of an array (hereinafter referred to as to an array-like light source).

A device disclosed in Japanese Patent Application Open to Public Inspection No. 62-134624 in which a back light and a liquid crystal shutter array are combined, and a device called a VFPH (vacuum fluorescent print head) which uses a printing head having a vacuum fluorescent tube light source have been proposed. The vacuum fluorescent tube light source has an easily obtainable high luminance, a high responding ability and a thin type. As the phosphor, an oxidized zinc phosphor (ZnO:Zn) is selected for durability.

LED light source is used as a light source in the electro-photography. In the LED light source, a high density array of 300 dpi or 400 dpi can be manufactured for red by a photomask method. However, for blue and green, the LED array can not be produced at present by the same method as that for red.

Further, among the abovementioned light sources, the liquid crystal shutter array is not suitable for use in high speed recording because of a relatively slow responding speed.

On the other hand, with regard to LED for green and blue, it is difficult to obtain them at a low cost, even in a form of a single element light source. Further, an array-like light source may be made in such a way that the single elements are arranged in an array form. However, with such an arrangement, the mounting density of the elements may be lowered. Accordingly, the resolution of the output image formed by it may be also lowered with the lowered mounting density, causing a problem of image quality degradation. For this problem, a technique to improve the resolution by the use of a reducing optical device may be considered. However, such a technique raises other problems because that the apparatus becomes large in size and manufacturing cost is increased.

Furthermore, the wavelength of the light emitted by the VFPH using the oxidized zinc phosphor (ZnO:Zn) shows a curve which has a peak around 500 nm and widens broadly from the peak point. Therefore, since the light is easily separated into three color lights of blue, green and red, the exposure for color instant film has been conducted by a method using this technique.

However, when the exposure for a silver halide color photosensitive material, in particular, for a color paper (hereinafter referred to as to a printing paper) is conducted with the above method, since an amount of red light is insufficient, the exposure inevitably takes a long time, problem causing the of preventing the image recording at high speed.

For this problem, changing of the components of the phosphor could be considered to improve the sensitivity for red. However, the change raises another problem in that the life span of the phosphor becomes short, resulting in an increase of the running cost.

SUMMARY OF THE INVENTION

The present invention has been devised in view of the above problems. The object of the present invention is to provide an image recording apparatus with which the exposure for a silver halide color photosensitive material including a printing paper can be conducted at a high speed, a high quality image can be obtained, the apparatus can be made small in size, and further the apparatus can be produced at a low cost.

The present invention solves the above problems with the following structures.

Structure 1 is structured in such a manner that an exposure means is equipped with LED recording elements and vacuum fluorescent tube elements, and the LED recording elements and the vacuum fluorescent tube elements conduct the exposure for the silver halide color photosensitive material on the basis of image data for each different color.

With the structure 1, the LED recording elements and the vacuum fluorescent tube recording elements are appropriately combined so that the color emission characteristic of the recording head and the photosensitive characteristic of the silver halide color photosensitive material are complemented. Since the exposure is conducted for each color with the combination of the LED recording elements and the vacuum fluorescent tube recording elements, the exposure for each color can be conducted efficiently. Accordingly, it is possible to make the exposure for the silver halide color photosensitive material more speedy. Further, since a high density array light source whose element density is high may be used, a high quality image can be formed at a high speed, and it is possible to make the apparatus small in size and to attain the cost-down.

In structure 2, the exposure means comprises a LED array in which the LED recording elements are arranged in a single line or plural lines and a vacuum fluorescent tube array in which the vacuum fluorescent tube recording elements are arranged in a single line or plural lines.

With the structure 2, higher speed recording can be conducted without lowering the image quality. Moreover, the structure of the apparatus can be made simple and the apparatus can be made smaller in size.

In structure 3, there is further provided a conveyance means to covey at least one of the exposure means or the silver halide color photosensitive in a direction perpendicular to the aligned direction along which the recording elements are aligned on the LED array and the vacuum fluorescent tube array.

With the structure 3, each dot of red, green and blue which means a dot image formed by a red color exposure, a dot image formed by a green color exposure, and a dot image formed by a blue color exposure respectively, is superimposed very well one after another with a simple structure of the apparatus and a simple signal processing. As a result, a dot forming ability is improved, a high quality image can be formed, and the apparatus can be made smaller in size.

In structure 4, the LED recording element conducts the red color exposure.

With the structure 4, since the LED recording elements with which a large amount of light can be easily obtained are adopted for the red exposure, a high speed exposure can be conducted as compared to the case in which VFPH is used for all colors. Accordingly, the structure 4 is preferable.

In structure 5, the vacuum fluorescent tube recording elements conduct the green color exposure and the blue color exposure.

With the structure 5, since the vacuum fluorescent tube recording elements having both spectral characteristic are adopted for the green color exposure and the blue color exposure, the high density array light source can be used. Whereby a high quality image can be obtained, and the cost-down for the light source, and the cost-down for the resulting, apparatus can be attained. Accordingly, the structure 5 is preferable.

In structure 6, the exposure means is equipped with a yellow filter and a blue filter. The silver halide color photosensitive material is a photosensitive material in which a peak in the green color sensitivity is twice or more greater than the peak in the red color sensitivity, the green color exposure is conducted by the vacuum fluorescent tube array and the yellow filter, and the blue color exposure is conducted by the vacuum fluorescent tube array and the blue filter.

With the structure 6, since the silver halide color photosensitive material has a relatively low sensitivity for red color, the yellow filter which has a higher transmission rate for green color, as compared to the green filter, is adopted, although the yellow filter allows red light to pass through. With such a yellow filter, the exposure efficiency for green is enhanced and the high quality image exposure can be conducted at a more high speed.

DETAILED DESCRIPTION OF THE PREFERRED EMBODIMENT

Hereinafter, embodiments of the present invention will be explained with reference to the drawings.

Figure 1:
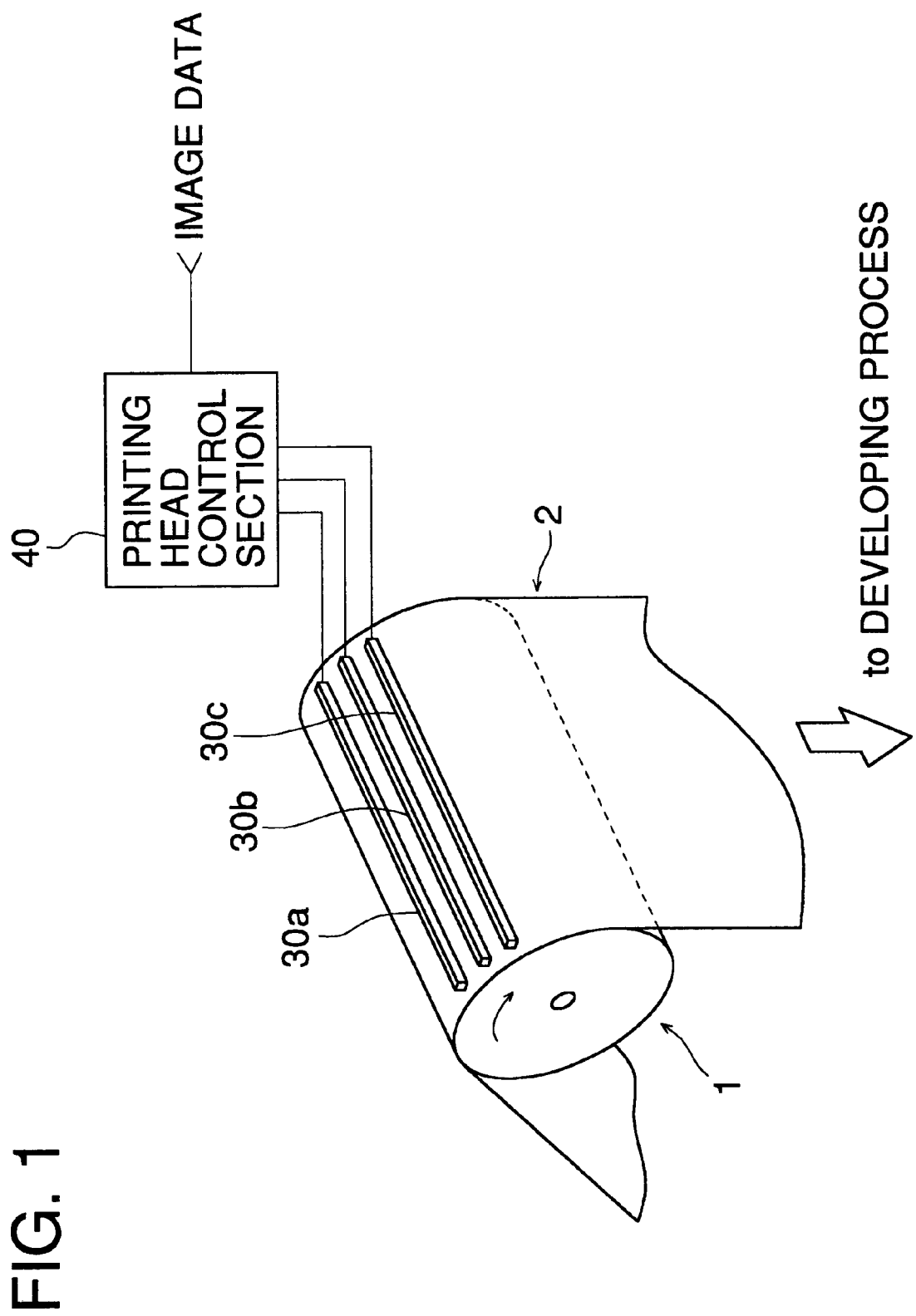
FIG. 1 is a view showing an outlined construction of the image recording apparatus of the present invention.

FIG. 1 is an outlined view showing a structure of an image recording apparatus. A color photographic printing paper 2 made of a silver halide color photosensitive material (hereinafter merely referred to as to a printing paper) is drawn out from a roll by a support drum 1 acting as a conveyance control means which is driven and rotated by a conveyance drive source not illustrated, and further the printing paper 2 is conveyed in the direction of the arrow shown in FIG. 1. A red light source printing head 30a having a LED array and a green light source printing head 30b and a blue light source printing head 30c both having a vacuum fluorescent tube array are subjected to an exposure control in accordance with image data by a printing head control section 40 so that an exposure is conducted on a required position on the printing paper 2 for each color. After the exposure process has been completed, the printing paper 2 is further conveyed to a developing section in which the printing paper 2 is subjected to the developing process so that a visual image can be obtained.

A plurality of recording elements which are arranged in an array form of a single line or plural lines are used on each printing head. Specifically, the red light source printing head 30a is provided with a LED array. The LED array is provided with recording elements having element density of 300 dpi and is combined with Selfoc lens array working as an image forming optical system. On the other hand, the green light source printing head 30b and the blue light source printing head 30c each is provided with a combination of a vacuum fluorescent tube printing head and a color separation filter. The vacuum fluorescent tube printing head includes a combination of a 300 dpi vacuum fluorescent tube array and a Selfoc lens array working as an image forming system. Incidentally, the combination of the vacuum fluorescent tube array tube and the Selfoc lens array is referred to as the VFPH mentioned above. Further, the printing paper form is not limited to the roll form explained above.

The conveyance control means for the printing paper 2 is not limited to the support drum 1 shown in FIG. 1. Further, another conveyance type in which the printing paper 2 is fixed and the printing head is movable, or still another type in which the printing paper 2 and the printing head both are movable may be used. Still further, the image forming optical system for the recording elements is not limited to the Selfoc lens array, a roof mirror lens array may be used as the image forming optical system.

Figure 2:
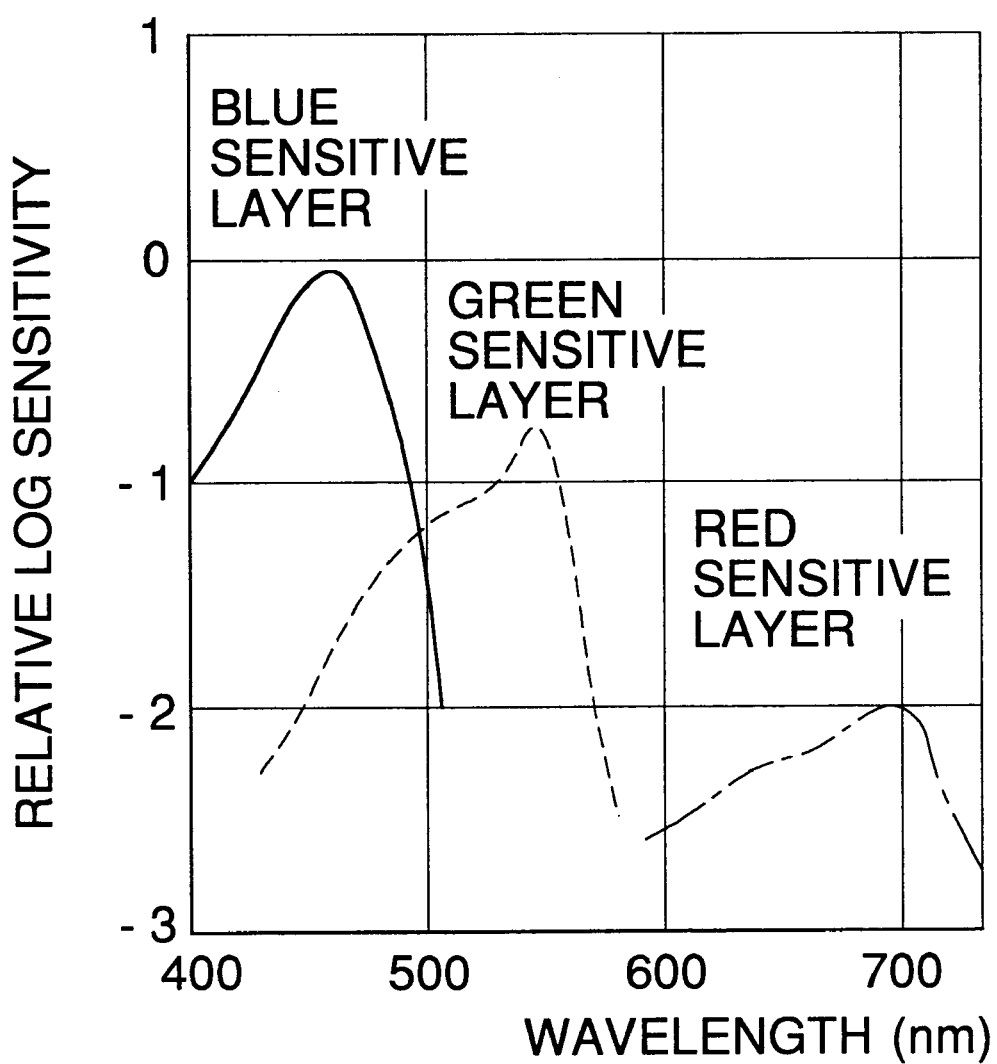
FIG. 2 is a characteristic diagram showing a spectral sensitivity of the printing paper of the present invention.

FIG. 2 is a view showing a characteristic of the spectral sensitivity of the printing paper 2.

As can be seen from FIG. 2, the sensitivity of the green sensitive layer is weaker than the blue sensitive layer. The red sensitive layer is more weak. That is, the sensitivity of the red sensitive layer is a half or more lower than that of the green sensitive layer. This characteristic is the specific characteristic of the printing paper. In photographing material such as a color instant film, the sensitivity of the red sensitive layer does not have such a great difference as compared with the other layers.

Figure 3:
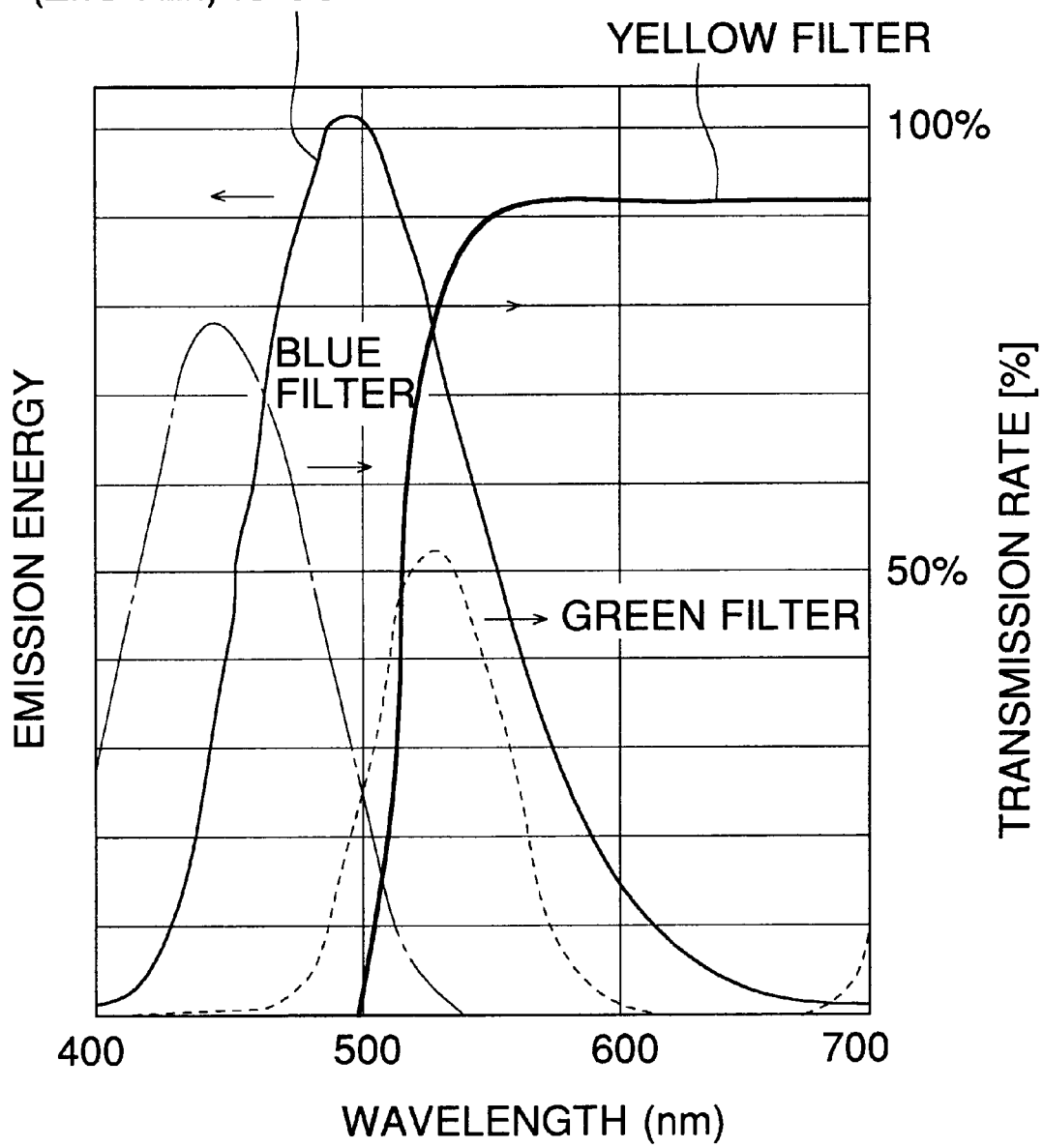
FIG. 3 is a characteristic diagram showing the emitting energy of the vacuum fluorescent tube array and a transmission rate of each color separation filter.

FIG. 3 shows a characteristic curve showing a characteristic of the emitting energy of the vacuum fluorescent tube array in which an oxidized zinc phosphor (ZnO:Zn) is used and a transmission rate of each color separation filter.

In the present embodiment, a LED array and a vacuum fluorescent tube array are combined appropriately so as to complement the color light emission characteristic of the recording head so that an exposure is efficiently conducted for each color. As a result, the exposure for the silver halide color photosensitive material can be conducted with high speed. Further, since the recording elements whose recording element density is 300 dpi are used, a high quality image can be obtained and the apparatus may be made in a small size. In particular, since the LED array is used for the red color exposure and the vacuum fluorescent tube array combined with a proper filter is used for the green color exposure and the blue color exposure, the light emission characteristic of the LED array complements the characteristic of the printing paper whose red color sensitivity is relatively low. Accordingly, a high speed exposure recording can be conducted and the apparatus can be produced at a low cost. For the green color exposure and the blue color exposure, a device in which a plurality of aligned and mounted LED single element, which inevitably lower the image resolution, are not used as a substitute for the LED array. Instead, the vacuum fluorescent tube array is used and the light emission characteristic of the vacuum fluorescent tube array complements the low image resolution. As a result, a high image resolution can be obtained and a small size apparatus which does not need to use a reducing optical system may be realized.

The first embodiment of the recording operation is explained with reference to FIG. 4.

A red light source printing head 30a having a LED array 33a, a green light source printing head 30b having a vacuum fluorescent tube array 33b and a blue light source printing head 30c having a vacuum fluorescent tube array 33c are aligned along the conveying direction of the printing paper 2. When these printing heads are subjected to the exposure control in accordance with image data by a printing head control section 40, emitted lights are focused on the printing paper 2 by Selfoc lenses 31a, 31b and 31c and an image corresponding to each color component is recorded. In this embodiment, a yellow filter 32b and a blue filter 32c both used for color separation are inserted into the green light source printing head 30b and the blue light source printing head 30c respectively. In order to regulate light amount, AND filter may be used in accordance with a requirement for each printing head.

As can be seen from FIG. 3, the reason why the yellow filer is used for the color separation for green is that the yellow filter has a higher transmission rate for a green light as compared to the green filter. Usually, the following are used as the color separation filters for blue, green and red, in a visual light region of 400 nm to 700 nm in wavelength: a blue filter which mainly transmits a light whose wavelength is shorter than 500 rim, a green filter which mainly transmits a light whose wavelength is in a range of 500 nm to 600 nm, and a red filter which mainly transmits a light whose wavelength is longer than 600 nm are used.

Incidentally, the yellow filter is generally referred to as Yellow Filter or Y-filter and is sold in a market. For example, LEE filter HT015 (Y-filter) manufactured by Konica Color Kizai (Kabu) has a transmission rate higher than 50% for a wavelength of 550 nm so that it may be preferably used. Further, with regard to the blue filter, also, LEE filter 181 (B-filter) manufactured by Konica Color Kizai (Kabu) has a transmission rate higher than 30% for a wavelength of 430 nm so that it may be preferably used. In this way, since a filter sold in a market may be used, the apparatus can be manufactured at a low cost.

As shown in FIG. 3, since the green filter is sandwiched between the wavelength regions of blue and red, the green filter becomes necessarily a band-pass type. A peak transmission rate of the green filter becomes inevitably small in order to refrain the light leakage of both of green and red color components and green light of the vacuum fluorescent tube array 33b may not be extracted efficiently. In contrast, since the yellow filter transmits light whose wavelength is longer than approximately 500 nm, green light of the vacuum fluorescent tube array 33b can be extracted efficiently.

Although the yellow filter may transmit red light simultaneously, since the sensitivity of the printing paper 2 for red is excessively low as shown in FIG. 2, red is not substantially formed on the printing paper. Therefore, the vacuum fluorescent tube array 33b is used for the recording on the printing paper 2 with the yellow filter 32b. As a result, the exposure efficiency of green can be increased, and the exposure capable of obtaining a high image quality can be conducted at a relatively high speed.

An embodiment in which the color recording of one line is conducted on "a" point on the printing paper will be explained with the reference to FIGS. 1 and 4.

Firstly, the printing head control section 40 transports the red color image data, the green color image data and the blue color image data each corresponding in amount to one line to each printing head. The support drum 1 conveys the printing paper 2 at a predetermined speed. When "a" point on the printing paper 2 arrives at an image forming point (1) of the red color light source printing head 30a, the red color light source printing head 30a conducts an exposure in accordance with the image data under the control by the printing head control section 40, and the recording with regard to the red color image data is conducted on the printing paper 2.

Thereafter, as the printing paper 2 is being conveyed, the exposure control is conducted in the same manner as the above in synchronization with the timings when the "a" point successively arrives at the image forming point (2) of the green light source printing head 30a and the image forming point (3) of the blue light source printing head 30c, whereby the color image recording is conducted on the "a" point. The printing operation is repeated in the above manner, whereby a color image is recorded on a required region on the printing paper 2.

Figure 5:
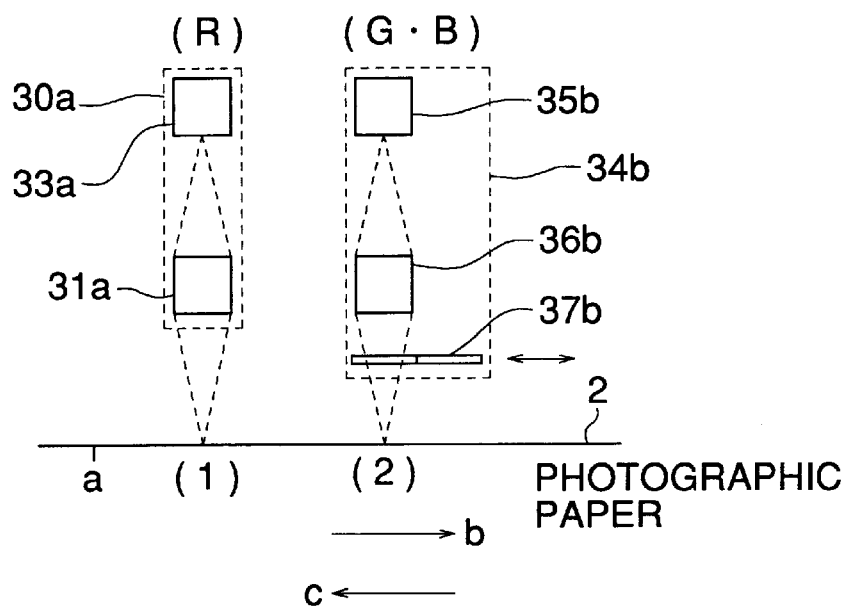
FIG. 5 is a explanatory view showing the second embodiment with regard to the recording operation of the present invention.

FIG. 5 is a diagram to explain the second embodiment with regard to the recording operation.

In the apparatus, the red light source printing head 30a having LED array 33a and the green-blue combination light source printing head 34b having the vacuum fluorescent tube array 35b are aligned. When the printing paper 2 is conveyed in "b" direction, the exposure for red and green is conducted. Thereafter, the printing paper 2 is returned in "c" direction. Then, when the printing paper 2 is conveyed again in the "b" direction, the exposure for blue is conducted.

Firstly, the exposure for red and green is conducted in the first exposure process. Filter 37b is arranged in the optical path of the vacuum fluorescent tube array 35b. The filter 37b is driven in the arrow mark direction by a solenoid which is not illustrated so that the used filter is changed alternately to either the yellow filter or the blue filter. During the first exposure process, the yellow filter is set in use.

The printing head control section 40 transports one line data of red component image data to the red light source printing head 30a and one line data of green component image data to the green-blue combination light source printing head 34b. When the "a" point on the printing paper 2 arrives at the image forming point (1) of the red light source printing head 30a with the rotation of the support drum 1, the exposure is conducted in accordance with the image data so that the red component image data is recorded on the printing paper 2. Subsequently, when the "a" point arrives at the image forming point (2) of the green-blue combination light source printing head 34b as the printing paper is conveyed, the exposure for green is conducted. The exposure operation mentioned above is repeated in the same manner as the first embodiment, whereby the first exposure process for the required region on the printing paper 2 is completed.

Next, during the time that the solenoid is actuated so as to change the used filter to the blue filter, the printing head control section 40 transports one line data of blue component image data to the vacuum fluorescent tube array 35b. As a result, the second exposure process is ready for the exposure for blue. The support drum 1 is rotated in the reverse rotation direction, whereby the printing paper is conveyed in the "c" direction. When the "a" point on the printing paper 2 arrives at the image forming point (2) of the green-blue combination light source printing head 34b, the support drum 1 is rotated in the regular direction as in the first exposure process so that the printing paper 2 is conveyed in the "b" direction. The exposure for blue is sequentially conducted in synchronization with the timing so that the position of each line which was exposed in the first exposure process arrives at the image forming point (2). As a result, during the second exposure process, blue component image data are recorded on the printing paper 2. Incidentally, in the present embodiment, the exposure process is conducted in such a way that one image is processed as one unit. However, the exposure process may be repeated in such a way that one line is processed as one unit.

Figure 4:
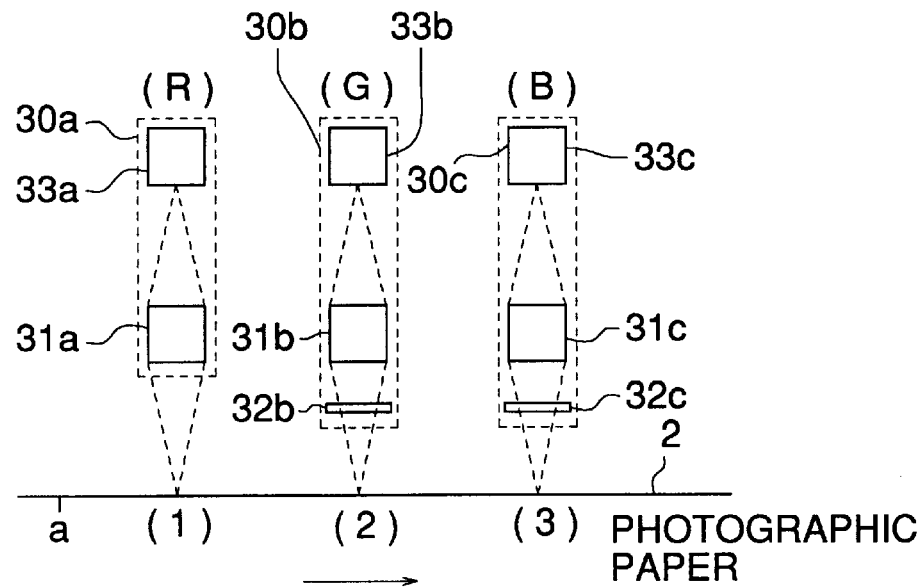
FIG. 4 is a explanatory view showing the first embodiment with regard to the recording operation of the present invention.

In FIGS. 4 and 5, the recording operation is explained with reference to the array example in which the recording elements are aligned in one line. However, with an array in which the recording elements are aligned in plural lines or another array in which the recording elements are arranged in form of a panel, if the exposure control is conducted so as to make an appropriate timing between the image forming point of each printing head and the recording position on the printing paper, a color image recording can be conducted.

Thus, a high speed recording can be conducted with the first embodiment. Further, the image recording apparatus can be manufactured at a low cost with the second embodiment in which only two sets of the printing heads are used.

As mentioned above, with Structure 1, the LED recording elements and the vacuum fluorescent tube recording elements are appropriately combined so that the color emission characteristic of the recording head and the photosensitive characteristic of the silver halide color photosensitive material are complemented. Since the exposure is conducted for each color with the combination of the LED recording elements and the vacuum fluorescent tube recording elements, the exposure for each color can be conducted efficiently. Accordingly, it is possible to make the exposure for the silver halide color photosensitive material more speedy. Further, since a high density array light source whose element density is high may be used, a high quality image can be formed at a high speed, and it is possible to make the apparatus small in size and to attain the cost-down.

With the structure 2, a more high speed recording can be conducted without lowering the image quality. Moreover, the structure of the apparatus can be made simple and the apparatus can be made smaller in size.

With the structure 3, each dot of red, green and blue is superimposed very well one after another with a simple structure of the apparatus and a simple signal processing. As a result, a dot forming ability is improved, a high quality image can be formed, and the apparatus can be made smaller in size.

With the structure 4, since the LED recording elements are adopted, a high speed exposure can be conducted as compared to the case in which VFPH is used for all colors. Accordingly, the structure 4 is preferable.

With the structure 5, since the vacuum fluorescent tube recording elements are adopted, the high density array light source is used. Whereby a high quality image can be obtained, and the cost-down for the light source, and the resulting cost-down for the apparatus can be attained. Accordingly, the structure 5 is preferable.

With the structure 6, since the yellow filter is adopted, the exposure efficiency for green is enhanced and the high quality image exposure can be conducted at a higher speed.

What is claimed is:

1. A method of recording an image on silver halide color photosensitive material, comprising:
    (a) inputting image data including red image data, green image data and blue image data; and
    (b) driving a plurality of LEDs based on the red image data so as to emit first light, driving a plurality of vacuum fluorescent tube elements based on the green image data so as to emit second light, driving the plurality of vacuum fluorescent tube elements based on the blue image data so as to emit third light, and exposing a silver halide color photosensitive material, which has spectral sensitivity in which a peak of sensitivity in green is at least twice greater than a peak of sensitivity in red, with the first light, the second light and the third light.

2. The method of claim 1, wherein the second light is transmitted via a yellow filter, the third light is transmitted via a blue filter, and the silver halide color photosensitive material is exposed with the second light transmitted via the yellow filter and the third light transmitted via the blue filter.

3. The method of claim 2, wherein the yellow filter has a transmission rate higher than 50% for a wavelength of 550 nm and the blue filter has a transmission rate higher than 30% for a wavelength of 430 nm.

4. The method of claim 1, wherein the plurality of LEDs are aligned in an array of at least a single line and the plurality of vacuum fluorescent tube elements are aligned in an array of at least a single line.

5. The method of claim 4, wherein the driving of (b) is conducted as the silver halide color photosensitive material or both the plurality of LEDs and the plurality of vacuum fluorescent tube elements is/are conveyed in a direction in which the plurality of LEDs and the plurality of vacuum fluorescent tube elements are aligned.

6. An apparatus for recording an image on a silver halide color photosensitive material, comprising:
    a plurality of LEDs;
    a plurality of vacuum fluorescent tube elements; and
    a controller for receiving image data including red image data, green image data and blue image data, the controller controlling the plurality of LEDs in accordance with the red image data so that the plurality of LEDs emit first light, the controller controlling the plurality of vacuum fluorescent tube elements in accordance with the green image data so that the plurality of vacuum fluorescent tube elements emit second light, and the controller controlling the plurality of vacuum fluorescent tube elements in accordance with the blue image data so that the plurality of vacuum fluorescent tube elements emit third light, wherein a silver halide color photosensitive material, which has spectral sensitivity in which a peak of sensitivity in green is at least twice greater than a peak of sensitivity in red, is exposed by the first light, the second light and the third light.

7. The apparatus of claim 6, further comprising:
    a yellow filter in a light path of the second light, for transmitting the second light via the yellow filter; and
    a blue filter in a light path of the third light, for transmitting the third light via the blue filter,
    wherein the first light emitted by the plurality of LEDs has the color red, and wherein the silver halide color photosensitive material is exposed by the first light, the second light transmitted via the yellow filter and the third light transmitted via the blue filter.

8. The apparatus of claim 7, wherein the yellow filter has a transmission rate higher than 50% for a wavelength of 550 nm and wherein the blue filter has a transmission rate higher than 30% for a wavelength of 430 nm.

9. The apparatus of claim 6, wherein the plurality of LEDs are aligned in an array of at least a single line and the plurality of vacuum fluorescent tube elements are aligned in an array of at least a single line.

10. The apparatus of claim 9, further comprising a conveyance device for conveying the silver halide color photosensitive material, or both the plurality of LEDs and the plurality of vacuum fluorescent tube elements in a direction in which the plurality of LEDs and the plurality of vacuum fluorescent tube elements are aligned, wherein the silver halide color photosensitive material is exposed as the silver halide color photosensitive material is conveyed relative to the plurality of LEDs and the plurality of vacuum fluorescent tube elements.

* * * * *